(12) United States Patent
Manlove et al.

(10) Patent No.: US 6,426,663 B1
(45) Date of Patent: Jul. 30, 2002

(54) ANALOG/DIGITAL FEEDBACK CIRCUITRY FOR MINIMIZING DC OFFSET VARIATIONS IN AN ANALOG SIGNAL

(75) Inventors: Gregory Jon Manlove; Mark Billings Kearney, both of Kokomo; Mark Russell Keyse, Sharpsville; Richard Joseph Ravas, Kokomo, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 08/610,007

(22) Filed: Mar. 4, 1996

(51) Int. Cl.$^7$ ................................................ H03F 1/02
(52) U.S. Cl. ...................................... 327/307; 330/259
(58) Field of Search ................................ 327/100, 362, 327/331, 332, 363, 307, 306, 77; 330/259, 190, 9

(56) References Cited

U.S. PATENT DOCUMENTS

| | | | |
|---|---|---|---|
| 3,028,550 A | | 4/1962 | Maydan et al. ............... 324/70 |
| 4,395,681 A | * | 7/1983 | Hornung et al. ............. 330/259 |
| 5,416,481 A | * | 5/1995 | Chen ........................... 341/131 |

FOREIGN PATENT DOCUMENTS

| | | |
|---|---|---|
| JP | 60211501 | 10/1985 |
| JP | 07332982 A | 12/1995 |
| WO | 8600416 A | 1/1986 |

* cited by examiner

Primary Examiner—Dinh T. Le
(74) Attorney, Agent, or Firm—Jimmy L. Funke

(57) ABSTRACT

An analog signal gain circuit includes an input receiving an analog input signal defined by an ac signal component due to a driving force and a dc offset component independent of the driving force and an output providing an analog output signal defined by an amplified representation of the analog input signal and a dc offset component corresponding to a reference signal. A digital/analog feedback circuit includes a comparator having the reference signal as a switching threshold connected to an up/down counter having a number of digital outputs. The outputs of the up/down counter are connected to a D/A converter which converts the digital count to an analog feedback signal. The feedback signal is provided to the input of the analog signal gain circuit to minimize variations in the dc offset signal component of the analog output signal by compensating for the dc offset signal component of the analog input signal. The up/down counter is clocked at a slow rate to thereby provide a long time constant for minimizing the dc offset signal component.

22 Claims, 3 Drawing Sheets

ANALOG/DIGITAL FEEDBACK CIRCUITRY FOR MINIMIZING DC OFFSET VARIATIONS IN AN ANALOG SIGNAL

FIELD OF THE INVENTION

The present invention relates generally to circuitry for minimizing dc offset variations in an analog signal, and more specifically to circuitry for minimizing such variations in an analog signal defined by an ac signal component due to a driving force and a dc offset signal component independent of the driving force.

BACKGROUND OF THE INVENTION

Airbag systems are commonly used in automotive applications to provide protection for the vehicle operator and/or passenger in the event of a vehicular collision. One known technique for implementing an airbag system includes detecting vehicular acceleration via an accelerometer and then evaluating the resulting acceleration signal to determine whether an impact of sufficient severity has occurred to require the airbag to deploy.

Accelerometers may be formed in accordance with a variety of known techniques, and an increasingly popular accelerometer used in automotive airbag systems comprises a piezoresistive sensor, typically micro-machined, whose differential analog output voltage (VDIFF) is proportional to the applied acceleration. The differential output, VDIFF, is typically represented by the following equation:

$$V_{DIFF} = (S*g \pm V_{OFF}) \quad (1),$$

where S is the sensitivity of the sensor (typically in units or uV/g or mV/g), g is the applied acceleration (or deceleration), and VOFF is an offset voltage of the sensor that is independent of applied acceleration (or deceleration). The differential output voltage of accelerometers typically used in automotive airbag applications thus provide an analog acceleration signal defined by an ac signal component due to the driving force (acceleration/deceleration) and a dc offset signal component independent of the driving force. The sensitivity term, S, and offset term, $V_{OFF}$, of equation (1) are typically dependent upon temperature, fabrication process variations, physical stress due to packaging and mounting of the sensor, and other factors.

Most applications which use accelerometers include signal conditioning circuitry for amplifying the analog acceleration signal and to compensate for sensitivity and dc offset variations. One drawback associated with such signal conditioning circuitry is the need for cancellation of the dc offset term, $V_{OFF}$. Although $V_{OFF}$ may be minimized at the input of such signal conditioning circuitry to thereby minimize temperature dependent effects on $V_{OFF}$ due to the signal conditioning circuitry, any residual offset voltage, $V_{OFF}$, is multiplied by the gain of the signal conditioning circuitry. With the high gains typically associated with such signal conditioning circuitry, the resulting temperature-dependent dc offset voltage, $V_{OFF}$, may vary to unacceptable levels over the operating temperature range. For example, typical accelerometer-based airbag systems require dc offset errors of less than 20 mV over an operating temperature range of between −40° C. and +125° C. With a typical signal conditioning circuitry gain of 200, variations in $V_{OFF}$, due to temperature dependency alone, must be less than approximately 0.6 micro volts/T(° C.) to meet the 20 mV offset error over the entire temperature range.

Variations in $V_{OFF}$ typically change very slowly in comparison with impact data capture rates of most airbag systems. As such, it is desirable to compensate for such slow variations with a correspondingly slowly changing compensation technique. Since most applications which use accelerometers also include a microprocessor to process the acceleration signal, a popular technique for compensating the slowly varying DC offset signal, $V_{OFF}$, is to implement a software algorithm executable by the microprocessor to provide a long time constant "software" filter. The dominant error in such a filter is the quantization noise of the analog-to-digital (A/D) converter, which is typically 20 mV for an 8 bit 5 volt application.

Although such microprocessor-based airbag systems have been used extensively, they have a number of drawbacks. First, such a system is designed around a process optimized for digital circuits. These requirements are inconsistent with the requirements for processing analog signals such as those provided by an analog accelerometer. Second, microprocessors are typically large and complicated integrated circuits, resulting in significant cost and area penalties for the circuit and system designers. Finally, the finite resolution of typical A/D converters in such systems introduces error into the algorithm, as previously discussed, which may be unacceptable for some applications.

To avoid the foregoing drawbacks of a microprocessor-based acceleration signal evaluating system, it is desirable to implement an analog signal processing system for evaluating the analog acceleration signal. An example of one such system is described in U.S. patent application Ser. No. 08/610,021, and entitled "Analog Signal Processing System for Determining Airbag Deployment", which is assigned to the assignee of the present invention, and which patent application is herein incorporated by reference. However, such an analog signal processing system may not rely upon an easily implemented software algorithm to provide a long time constant filter, and must therefore provide other means for generating the long time constant filter. Preferably, the signal conditioning circuitry, analog signal processing system, and the long time constant filter are provided on a single integrated circuit which does not require costly external components for operation thereof.

To minimize variations in the dc offset component of an analog acceleration evaluating system, a number of known analog techniques have been implemented. For example, referring to FIG. 1, analog acceleration signal conditioning circuitry 10 is provided which is operable to minimize $V_{OFF}$ (equation (1)), prior to signal conditioning by the signal conditioning circuitry. System 10 includes an acceleration sensor 12 connected to a signal conditioner 14 via signal paths 16 and 18. Signal path 16 carries a first acceleration signal S+, and signal path 18 carries a second acceleration signal S−, wherein the differential input $V_{IN}$ to signal conditioner 14 is defined as $V_{IN}=(S+-S-)$. Referring to equation (1), $V_{IN}=V_{DIFF}$. The signal conditioner 14 provides a transfer function equal to $[(1/R_{IN})*A_V(T)]$. An output 20 of signal conditioner 14 thus provides a signal $V_{IN}$, nominally increased by some gain factor $A_V$, divided by an input resistance $R_{IN}$. The $A_V$ term not only provides gain for the input signal, but also includes a temperature dependency to compensate for the temperature dependency of equation (1). The output 20 of signal conditioner 14 is connected to an inverting input 22 of a first amplifier 24 via signal path 26. An output 30 of amplifier 24 is connected to one end of a resistor $R_2$ 32, the opposite end of which is connected to signal path 26. A non-inverting input 28 of amplifier 24 is connected to a mid-supply voltage $V_{MID}$.

Signal path 26 is further connected to a XY/Z input 34 of offset compensation circuit 36 via signal path 38. A first current source $I_D$ 40 provides current from a voltage source $V_S$ to an X input 42 of offset compensation circuit 36. A second current source $I_D$ 41 provides current from voltage source $V_S$ to XY/Z input 34 of offset compensation circuit 36. One end of a resistor $R_1$ 44 is connected to a Y input 48 of offset compensation circuit 36, which input is further connected to a first current source IE 45 operable to draw current out of offset compensation circuit 36. The opposite end of resistor $R_1$ 44 is connected to a temperature dependent voltage source V(T) 46. A second current source $I_E$ 50 is connected to a Z input 52 of offset compensation circuit 36, and is configured to draw current out of offset compensation circuit 36. The current IA flowing through signal path 38 is defined by the equation:

$$I_A = (I_D * V(T))/(I_E * R_1) \quad (2)$$

The output 30 of amplifier 24 is further connected to one end of a resistor $R_2$ 54, the opposite end of which is connected to an inverting input 56 of a second amplifier 58 via signal path 60. A non-inverting input 62 of amplifier 58 is connected to $V_{MID}$. An output 64 of amplifier 58 is connected to one end of a variable resistor $R_3$ 66, the opposite end of which is connected to signal path 60. Also connected to signal path 60 is a current source 68 operable to draw a current $I_F$ away from signal path 60. The output 64 of amplifier 58 provides the output signal $V_{OUT}$ 70 from the analog signal conditioning circuitry 10. The overall circuit response is represented by the following equation:

$$V_{OUT} = [((V_{IN}/R_{IN})*A_V(T)) + I_F - (I_D*V(T))/(I_E*R_1)]*R_3 + V_{MID}(1+R_3/R_2) \quad (3)$$

The circuitry 10 is adjusted for operation by first adjusting the value of $R_3$ 66 to provide a desired sensitivity gain. Thereafter at room temperature, temperature-dependent voltage V(T) is adjusted to $V_{MID}$. Also at room temperature, any undesirable offset component is also canceled by adjusting $I_F$ 68. Because V(T) has been set to $V_{MID}$, the offset compensation circuit 36 has no effect on room temperature operation of circuitry 10. Circuitry 10 is then taken to a different temperature, and the current $I_E$ 50 is adjusted with respect to current $I_D$ 40 so that the temperature dependence of the dc offset component $V_{OFF}$ (equation (1)) is minimized at the input 22 to amplifier 24. Circuitry 10 of FIG. 1 is further described in U.S. patent application Ser. No. 08/421, 956, filed Apr. 14, 1995, by Koglin, et al., and entitled "Programmable Transducer Amplifier Circuit", which is assigned to the assignee of the present invention, and which patent application is herein incorporated by reference.

In circuitry 10 of FIG. 1, the dc offset component, $V_{OFF}$, of equation (1), is canceled at the input of the amplification stage. However, since typical gains of such amplification circuits are 100 or greater, any slight error in $V_{OFF}$ at the input is multiplied by this amount. Such circuits, by themselves, may typically guarantee dc offset 15 variations within the range of +/- 300 mV over the operating temperature range. However, output 70 is typically connected to a microprocessor which cancels the remaining offset with a software filter to provide an acceleration signal having less than 20 mV of dc offset error, as may be required by an acceleration signal evaluating system. Circuitry 10 of FIG. 1, although it implements one known form of dc offset cancellation, it is not typically used without a microprocessor-based software filter. Circuitry 10 is insufficient to achieve an effective 20 mV offset error, by itself, in a strictly analog signal processing system.

Referring to FIG. 2, another known technique for canceling $V_{OFF}$ of equation (1) is shown. Circuitry 100 of FIG. 2 includes an analog sensor 102 connected to one end of a capacitor $C_1$ 104 via signal path 106, the opposite end of which is connected to an input 108 of gain stage 110. Input 108 is further connected to one end of a resistor $R_1$ 112, the opposite end of which is connected to a voltage supply 114, preferably set at $V_{MID}$. Sensor 102 is further connected to one end of a second capacitor $C_2$ 116 via signal path 118, the opposite end of which is connected to a second input 120 of gain stage 110. One end of a second resistor $R_2$ 122 is connected to input 120 of gain stage 110, the opposite end of which is connected to $V_{MID}$. An output 124 of gain stage 110 provides the amplified acceleration signal $V_{OUT}$.

In operation, capacitors $C_1$ 104 and $C_2$ 116, in conjunction with resistors $R_1$ 112 and $R_2$ 122, form a high pass filter operable to pass high frequency acceleration signals to the gain stage 110, yet block low frequency, or near-dc variations. Although circuitry 100 of FIG. 2 is effective to cancel $V_{OFF}$ of sensor 102, it has a number of limitations.

First, only the dc offset component, $V_{OFF}$, of sensor 102 is canceled. Any offset in gain stage 110 is thereby unaffected. Typical offsets at the input of a gain stage, such as gain stage 110, are in the range of 1–2 mV, and may be as much as 10 mV in MOS circuits. With gains of greater than 100, output offsets will therefore be in excess of 200 mV, which is unacceptable in a strictly analog acceleration signal processing system. Second, a long time constant of the high pass filter requires large values of R and C. In integrated circuitry, large values of R are extremely area intensive, and large C values can only be realized with external components. Use of such external componentry is both bulky and expensive. Finally, the high pass filter arrangement of circuitry 100 introduces a large impedance at the input of gain stage 110, which large input impedance amplifies the effects of any leakage current. Typical leakage currents specified on capacitors and between pins on printed circuit boards are in the range of 1 uA, and the input impedance of the high pass filter arrangement of circuitry 100 must be in the range of a megaohm or more to achieve the desired input high pass filter time constant with reasonable capacitor values. This combination of input impedance and leakage capacitance may generate more than 1 volt of offset at the input, which is far too great for the desired application.

Referring now to FIG. 3, yet another known technique for canceling $V_{OFF}$ of equation (1) is shown. Signal conditioning circuitry 150 of FIG. 3 utilizes a known feedback integrator to generate a high pass filter with a long time constant. Circuitry 150 includes an analog sensor 152 connected to one input 154 of gain stage 156 via signal path 158, and to a second input 160 of gain stage 156 via signal path 162. An output 164 of gain stage 156 is connected to one end of a resistor $R_F$ 166 via signal path 168. The opposite end of resistor $R_F$ 166 is connected to an inverting input 170 of amplifier 172 via signal path 174. A non-inverting input 176 is connected to mid-supply voltage $V_{MID}$. An output 178 of amplifier 172 is connected to one end of a feedback capacitor $C_F$ 180, the opposite end of which is connected to signal path 174. The output 178 of amplifier 172 is further connected to an input 182 of gain stage 156 via signal path 184. Output 164 of gain stage 156 is further provided as the analog output signal $V_{OUT}$ 186 of circuit 150.

The overall transfer response of circuitry 150 is represented by the following equation:

$$V_{OUT} = A_V/[1 + A_V/(jw*R_F*C_F)] + V_{MID} \quad (4),$$

where $A_V$ is the gain of gain stage 156, and w is the frequency of the applied signal in radians. Those skilled in the art will recognize that equation (4) represents a typical transfer response of a high pass filter.

Circuitry 150 is advantageous over circuitry 100 of FIG. 2 in that it effectively cancels the dc offset component of both the sensor 152 and the gain stage 156, as well as only requiring one external component (the capacitor CF) in an integrated circuit arrangement. One drawback to circuitry 150 of FIG. 3, like circuitry 100 of FIG. 2, is that it still requires a large external capacitor, $C_F$, and a large on-chip resistor, $R_F$, to realize the long time constant of the high pass filter. Due to high leakage currents associated with such external capacitors, the high-valued $R_F$ (typically about one megaohm) required by circuitry 150 results in excessively high voltage offsets at $V_{OUT}$ 186.

It is apparent that the foregoing prior art dc offset compensation circuits are insufficient to provide a completely integrated means for minimizing variations in $V_{OFF}$ of equation (1) in a strictly analog signal processing system. What is therefore needed is circuitry for minimizing variations in $V_{OFF}$ of equation (1), as well as minimizing variations in any dc offset attributable to the signal gain stage, which is easily integrated into a single integrated circuit, and which is capable of generating a long time constant filter while eliminating the need for any bulky and expensive external componentry.

SUMMARY OF THE INVENTION

The foregoing shortcomings of the prior art are addressed by the present invention. In accordance with one aspect of the present invention, analog signal conditioning circuitry comprises an amplifier having a first input receiving an analog input signal defined by an ac signal component due to a driving force and a dc offset signal component independent of the driving force, a second input receiving a reference signal and an output providing an analog output signal defined by an amplified representation of the analog input signal and a dc offset component corresponding to the reference signal, a low pass filter having an input connected to the amplifier output and an output providing a low frequency representation of the analog output signal, and a feedback circuit having a periodic clock signal associated therewith, a first input connected to the low pass filter output, a second input receiving the reference signal, and an output connected to the first input of the amplifier for providing an analog feedback signal thereto. The feedback circuit incrementally increases the analog feedback signal each clock cycle that the low frequency analog output signal exceeds the reference signal and incrementally decreases the analog feedback signal each clock cycle that the reference signal exceeds the low frequency analog output signal. The analog feedback signal compensates for variations in the dc offset component of the analog input signal to thereby maintain the dc offset component of the analog output signal within a predefined range of the reference signal.

In accordance with another aspect of the present invention, feedback circuitry for minimizing dc offset variations in an analog output signal of a gain circuit having an input receiving an analog input signal defined by an ac signal component due to a driving force and a dc offset component independent of the driving force, comprises a comparator having a first input receiving the analog output signal, a second input receiving a reference signal corresponding to a desired dc offset component of the analog output signal, and an output, a counter circuit having a count value associated therewith, a first input connected to the comparator output and a plurality of counter outputs. The counter circuit periodically changes the count value in a first direction when the analog output signal exceeds the reference signal and periodically changes the count value in a second opposite direction when the reference signal exceeds the analog output signal. The counter circuit provides digital output signals at the plurality of counter outputs corresponding to the count value. A signal converter is also provided and has a corresponding plurality of inputs connected to the plurality of counter outputs and an output connected to the input of the gain circuit. The signal converter circuit converts the plurality of digital output signals to an analog feedback signal and provides the analog feedback signal to the converter circuit output, wherein the analog feedback signal minimizes variations in the dc offset component of the analog output signal by compensating for variations in the dc offset component of the analog input signal.

In accordance with a further aspect of the present invention, an analog signal amplifier circuit having a first input receiving an analog input signal defined by an ac signal component due to a driving force and a dc offset component independent of the driving force, a second input receiving a reference signal and an output providing an analog output signal defined by an amplified representation of the analog input signal and a dc offset component corresponding to the reference signal is combined with feedback circuitry for minimizing variations in the dc offset component of the analog output signal. The feedback circuitry comprises a counter circuit having a count value associated therewith, a first input receiving the analog output signal, a second input receiving the reference signal and an output connected to the first input of the analog signal amplifier circuit. The counter circuit periodically changes the count value in a first direction when the analog output signal exceeds the reference signal and periodically changes the count value in a second opposite direction when the reference signal exceeds the analog output signal. The counter circuit provides an analog feedback signal at the counter circuit output proportional to the count value, wherein the analog feedback signal minimizes variations in the dc offset component of the analog output signal by compensating for variations in the dc offset component of the analog input signal.

One object of the present invention is to provide analog/digital feedback circuitry for minimizing dc offset variations in an analog output signal of a gain circuit having an input receiving an analog input signal defined by an ac signal component due to a driving force and a dc offset component independent of the driving force.

Another object of the present invention is to provide such feedback circuitry that eliminates the need for any external componentry.

Yet another object of the present invention is to provide an analog signal gain circuit having an input receiving an analog input signal defined by an ac signal component due to a driving force and a dc offset component independent of the driving force wherein variations in the dc offset component of the analog output signal of the gain circuit are minimized.

Still another object of the present invention is to provide such an analog signal gain circuit as a single integrated circuit.

These and other objects of the present invention will become more apparent from the following description of the preferred embodiment.

DESCRIPTION OF THE PREFERRED EMBODIMENT

Figure 1:
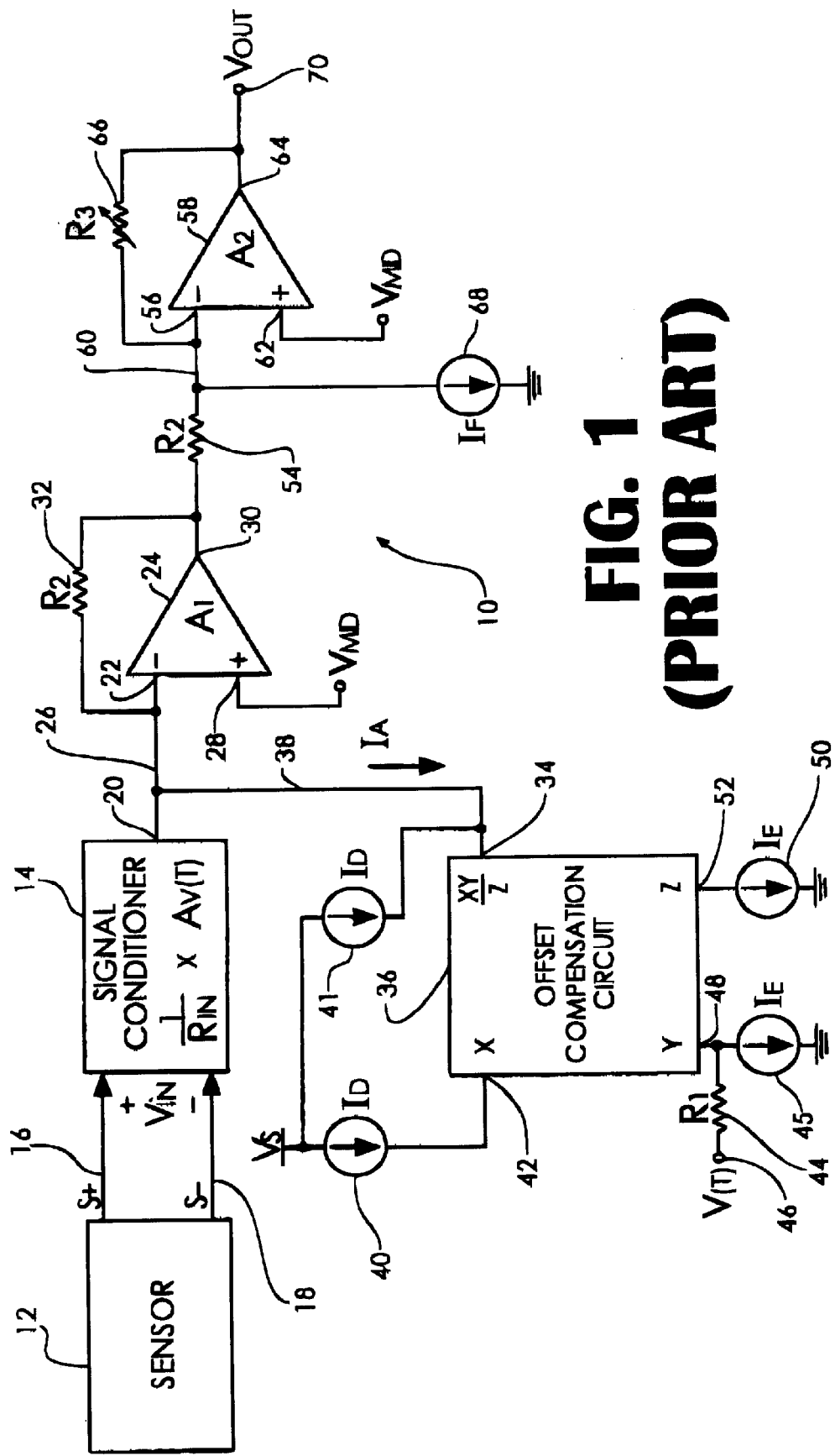
FIG. 1 is a diagrammatic illustration of an analog signal amplifier circuit showing one known technique for minimizing variations in the dc offset component of the analog input signal.
Figure 2:
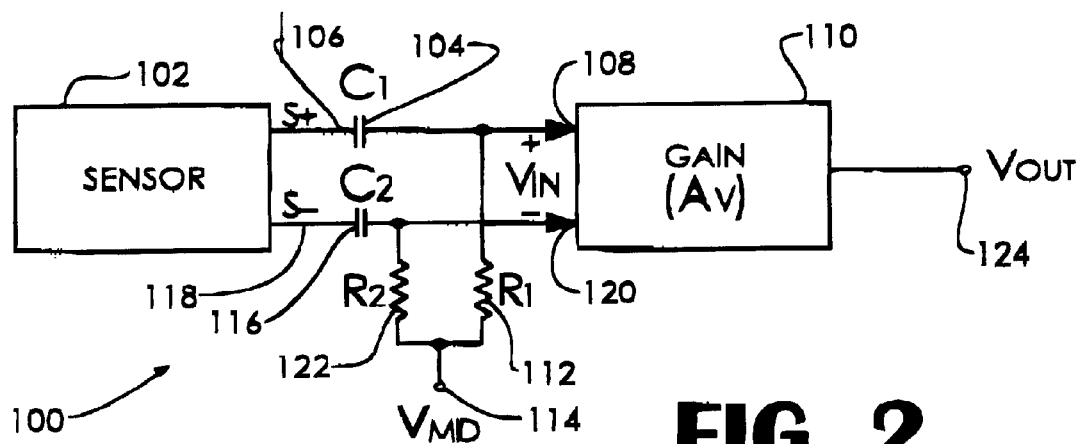
FIG. 2 is a diagrammatic illustration of an analog signal amplifier circuit showing another known technique for minimizing variations in the dc offset component of the analog input signal.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
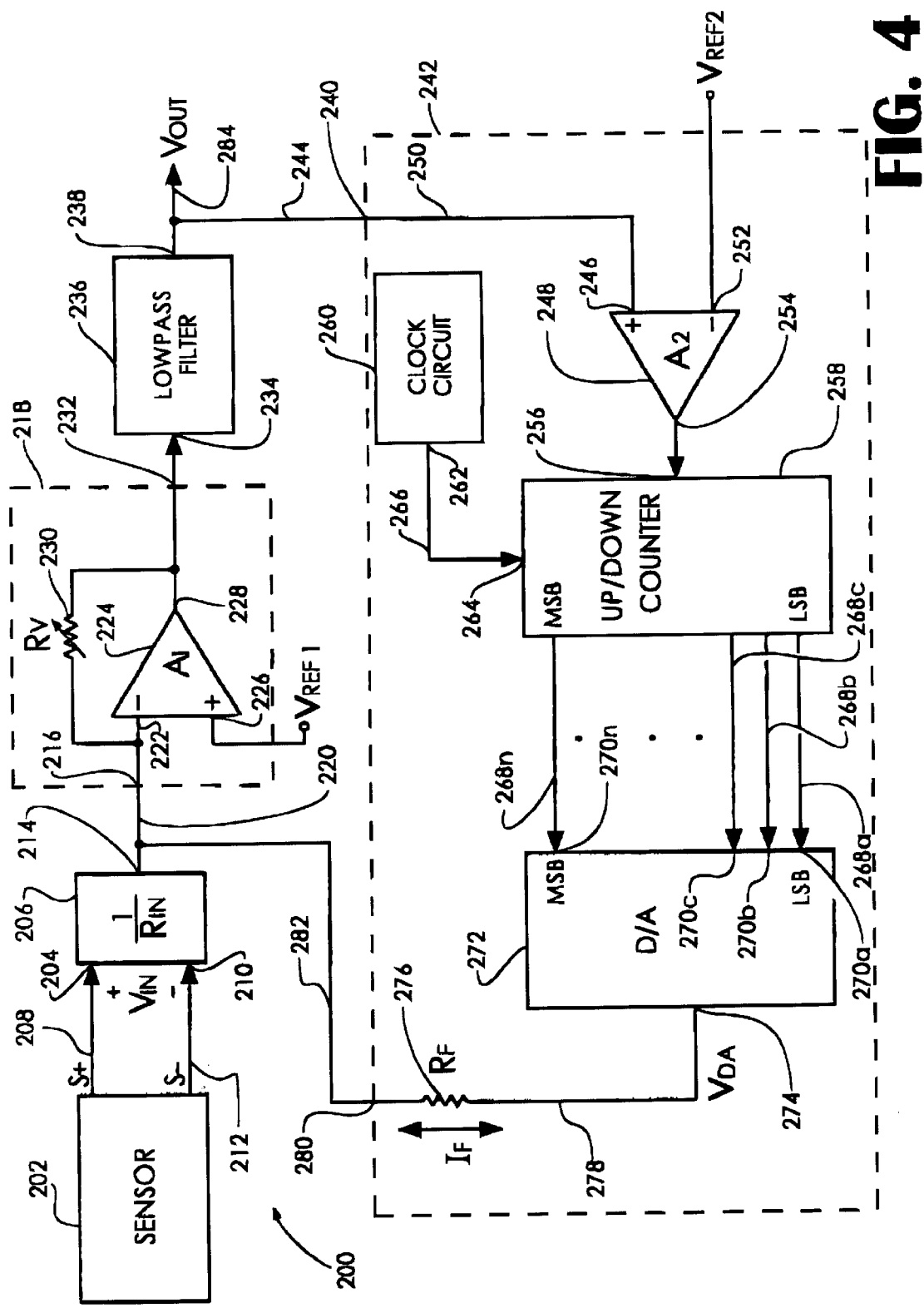
FIG. 4 is a diagrammatic illustration of an analog signal amplifier employing analog/digital feedback circuitry, in accordance with the present invention, for minimizing variations in the dc offset component of the analog input signal.

Referring now to FIG. 4, an analog signal processing circuit 200 for minimizing dc offset variations in an analog signal, in accordance with the present invention, is shown. Circuit 200 includes an analog sensor 202 connected to an input 204 of a transconductance stage 206 via signal path 208. Sensor 202 is also connected to a second input 210 of transconductance stage 206 via signal path 212. Preferably, sensor 202 is a micro-machined piezoresistive acceleration sensor, although the present invention contemplates that sensor 202 may be any of a variety of known acceleration sensors. In any case, sensor 202 should be operable to provide a differential output signal, $V_{DIFF}$, that is proportional to the applied acceleration, and which differential output signal is defined by an ac signal component due to acceleration/deceleration and a dc offset signal component independent of acceleration/deceleration. Preferably, $V_{DIFF}$ of sensor 202 may be represented by equation (1) set forth in the Background section.

Transconductance stage 206 is operable to receive a differential input signal $V_{IN}=(S+-S-)$, and produce a current of $1/R_{IN}$ times $V_{IN}$ at an output 214 thereof. Preferably, $V_{IN}=V_{DIFF}$ of equation (1), so that the current provided at output 214 of tranconductance stage 206 is equal to $V_{DIFF}/R_{IN}$.

Output 214 of tranconductance stage 206 is connected to an input 216 of a gain stage 218, which gain stage 218 is referenced at a voltage $V_{REF1}$. Preferably, $V_{REF1}$ is set at mid-supply voltage $V_{MID}$, although the present invention contemplates that $V_{REF1}$ may be any dc voltage or slowly varying ac voltage (any rate slower than the time constant of analog/digital feedback circuit 242). Those skilled in the art will recognize that gain stage 218 may be implemented in a variety of forms, and that the preferred structure of gain stage 218, as set forth below, does not limit the scope of the present invention. Preferably, input 216 of gain stage 218 is connected to an inverting input 222 of amplifier 224 via signal path 220. A non-inverting input 226 of amplifier 224 is connected to $V_{REF1}$. An output 228 of amplifier 224 is connected to one end of a variable-valued resistor $R_V$ 230, the opposite end of which is connected to signal path 220.

The output 228 of amplifier 224 is provided as an output 232 of gain stage 218, which is connected to an input 234 of low pass filter 236. Low pass filter 236 is operable to remove undesired resonant frequency effects from the analog acceleration signal provided at the output 228 of amplifier 224. Preferably, low pass filter 236 is a first-order 800 Hz switched capacitor low pass filter, although the present invention contemplates that low pass filter 236 may be any order filter and that the cut off frequency of low pass filter 236 may be set at any frequency below the resonant frequency of sensor 202. Low pass filter 236 further includes an output 238 from which low pass filter 236 provides the analog acceleration signal $V_{OUT}$ 284, which signal is suitable for evaluation by an analog signal processing system, such as an airbag system.

Output 238 of low pass filter 236 is connected to an input 240 of an analog/digital feedback circuit 242 via signal path 244. An output 280 of analog/digital feedback circuit 242 is connected to signal path 220 via signal path 282. Analog/digital feedback circuit 242 is operable to receive the analog acceleration signal from low pass filter 236, and provide a long time constant signal filter operation thereon, to thereby minimize dc offset variations in the analog acceleration signal.

Preferably, the input 240 of analog/digital feedback circuit 242 is connected to a non-inverting input 246 of a comparator 248 via signal path 250. An inverting input 252 of comparator 248 is connected to a reference voltage $V_{REF2}$. As with $V_{REF1}$, $V_{REF2}$ is preferably set at mid-supply voltage, $V_{MID}$, although the present invention contemplates that $V_{REF2}$ may be any dc voltage or slowly varying ac voltage. An output 254 of comparator 248 is connected to an input 256 of an up/down counter 258. Feedback circuit 242 further includes a clock circuit 260 operable to provide a periodic clock signal at an output 262 thereof, as is known in the art, which clock signal is provided to an input 264 of up/down counter 258 via signal path 266. Preferably, clock circuit 260 is operable, as is known in the art, to provide a variable rate clock signal at output 262 thereof. Specifically, clock circuit 260 may be configured to provide a clock signal at output 262 between 0 Hz and several hundred MHz. One example of such a clock circuit 260 may comprise a "divide-by" n resettable circuit referenced to a fast reference clock, wherein n may be selected from a predefined group of integers. Another example of such a clock circuit 260 may comprise a microprocessor which is programmable to provide any desired clock rate.

Up/down counter 258 is a digital circuit responsive to a signal at input 256 thereof to either increment or decrement a count value every cycle of the periodic clock signal provided by clock circuit 260. Preferably, up/down counter 258 is operable to increment the count value each clock cycle that the signal at input 256 thereof is a high level signal, and to otherwise decrement the count value each clock cycle, although the present invention contemplates that up/down counter 258 may be configured to increment the count value in response to a low level signal received at input 256 thereof and otherwise decrement the count value. Those skilled in the art will further recognize that up/down counter 258 may be alternatively designed to increment and/or decrement the count value in accordance with various predefined analog signal levels at input 256 thereof.

Up/down counter 258 includes a number of output lines 268a, 268b, 268c, ..., 268n, which output lines carry a digital representation of the count value contained within up/down counter 258. Input signal lines 268a, 268b, 268c, ..., 268n, are connected to corresponding inputs 270a, 270b, 270c, ..., 270n of a digital-to-analog (D/A) converter 272. D/A converter 272 is operable to convert the digital count value representation received at inputs 270a–270n to an analog voltage, VDA, which voltage is provided at an output 274 thereof. Output 274 of D/A 272 is connected to one end of a feedback resistor, $R_F$ 276, via signal path 278, the opposite end of which is provided as the output 280 of feedback circuit 242. The operation of analog processing circuitry 200, particularly with respect to analog/digital feedback circuit 242, will now be described in detail.

Figure 3:
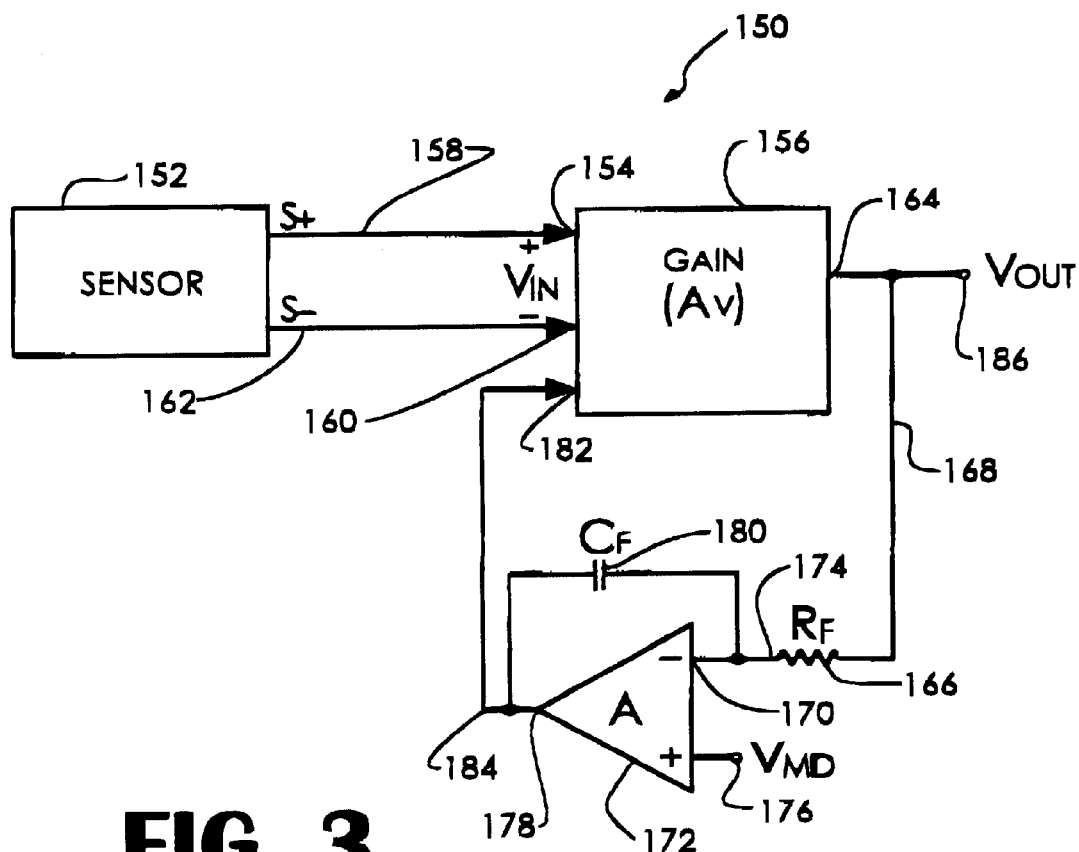
FIG. 3 is a diagrammatic illustration of an analog signal amplifier circuit showing yet another known technique for minimizing variations in the dc offset component of the analog input signal.

Analog processing circuit 200 incorporates concepts similar to those utilized in the feedback integrator scheme described with respect to FIG. 3 to compensate for variations in $V_{OFF}$ of equation (1). However, because circuit 200 utilizes digital circuitry to generate a long time constant for the $V_{OFF}$ filtering operation, it does not require large external components (namely a large capacitor and resistor) to generate such a time constant. Circuit 200 may thus be fabricated on a single integrated circuit, which results in a less costly, more area efficient and more reliable circuit.

The current $V_{IN}/R_{IN}$ applied to the input 216 of gain stage 218 is converted to an amplified analog output voltage across $R_V$ 230, which voltage appears at output 232 of gain stage 218. $R_V$ 230 is preferably made adjustable so that variations in the sensitivity, S (equation (1)), may be accounted for. The amplified analog output voltage provided at output 232 of gain stage 218 is applied to low pass filter 236, which is operable to filter out undesirable resonant frequency effects from the amplified analog output voltage and provide the desired analog acceleration signal at output 238 thereof.

The analog acceleration signal at output 238 is further applied to input 240 of analog/digital feedback circuit 242, and specifically to input 246 of comparator 248. If the analog acceleration signal is greater than $V_{REF2}$ (preferably mid-supply, $V_{MID}$), then comparator 248 provides a high-level signal at output 254 thereof. If, on the other hand, the analog acceleration signal is less than $V_{REF2}$, then comparator 248 provides a low-level signal at output 254.

The output 254 of comparator 248 is applied to an enabling input 256 of up/down counter 258. If the output 254 of comparator 248 is a high-level signal, up/down counter 258 is operable to increment a count value contained therein by a count value of one (1) for each rising edge of the clock signal provided at input 264 of up/down counter 258 via clock circuit 260. Conversely, if the output 254 of comparator 248 is a low-level signal, up/down counter 258 is operable to decrement the count value by a count value of one (1) for each rising edge of the clock signal.

It is to be understood that the "time constant" of the analog acceleration signal filtering operation provided by digital/analog feedback circuit 242 may be set to any desired value simply by establishing a corresponding clock rate for the clock signal provided at output 262 of clock circuit 260. For example, in one embodiment of the present invention, a high pass response of less than one (1) Hz is desired for digital/analog feedback circuit 242. In accordance with well known equations, such a high pass response corresponds to a time constant of 159 milliseconds. Thus, to achieve a high pass response of less than one Hz, up/down counter 258 is clocked approximately once every 159 milliseconds.

Up/down counter 258 may be designed to have any number (n) of outputs 268a–268n. Generally, a larger value of n ultimately corresponds to greater resolution in the analog acceleration signal compensating voltage $V_{DA}$. For example, in one embodiment, up/down counter 258 includes eight (8) flip flops, wherein an output of each flip flop is provided as an output of up/down counter 258. Eight such outputs 268a–268h corresponds to a total count value of 256 counts, which permits $V_{DA}$ to move approximately 20 millivolts between adjacent count values over an analog acceleration signal range of 5 volts. By contrast, adding two (2) up/down counter output lines increases the total count value to 1024 counts, which results in approximately a 5 millivolt change in $V_{DA}$ between adjacent count values under the same conditions.

The D/A 272 includes n digital signal inputs, wherein n corresponds to the number of outputs 268a–268n provided by up/down counter 258. The most significant bit (MSB) of D/A 272 is connected to the MSB of up/down counter 258, and the remaining bits are also connected in order. D/A 272 is operable to provide an analog feedback voltage $V_{DA}$ at output 274 thereof, which is applied through resistor $R_F$ 276 to provide a feedback current $I_F$. Depending upon the relative values of the voltage at the input 216 of gain stage 218 and the voltage $V_{DA}$ at any given time, $I_F$ may be provide to, or drawn from, input 216 of gain stage 218. In any event, $I_F$ is summed with the input sensor current $V_{IN}/R_{IN}$ to generate the desired $V_{OUT}$ 284. With $V_{REF1}=V_{REF2}=V_{MID}$, the overall transfer response of circuit 200 is thus represented by the following equation:

$$V_{OUT}=R_V[-V_{IN}/R_{IN}-V_{DA}/R_F]+V_{MID} \qquad (5).$$

Those skilled in the art will recognize from the foregoing, and from equation (5) in particular, that the resolution of digital/analog feedback circuit 242 is dependent not only upon the number of bits used by up/down counter 258 and D/A 272, but is further dependent upon the size (value) of $R_F$ 276. Generally, larger values of $R_F$ 276 permit correspondingly smaller changes in $I_F$ for a given $V_{DA}$ value. The actual value of $R_F$ 276 will, in practice, be dictated by the total amount of variation present in the offset component, $V_{OFF}$, of equation (1).

It should now be apparent that $V_{DA}$ is generated by a voltage referenced comparator 248 and an up/down counter 258 in cooperative relationship with a D/A converter 272. Any deviation in the offset components of $V_{OUT}$ (equation (5)) from the reference voltage causes comparator 248 to be correspondingly switched high or low. This, in turn, causes up/down counter 258 to correspondingly count up or down at a predefined rate as determined by the clock circuit 260. The operation of up/down counter 258 then causes output 274 of D/A 272 to correspondingly ramp up or down. Digital/analog feedback circuit 242 thus acts as an integrator to produce the desired high pass response.

The analog signal processing circuit 200, and particularly the digital/analog feedback circuit 242, enjoys a number of advantages over prior art arrangements. First, a long time constant is achieved by clocking an n-bit up/down counter. Since digital flip flops are very small in most integrated circuit fabrication processes, and particularly in known CMOS processes, the additional circuit complexity of such a counter is a small area penalty to pay to eliminate the need for external components. Second, feedback circuit 242 obviates the need for an external capacitor altogether. This results in cost and area savings, and eliminates leakage current associated with the capacitor from dominating the offset error. Third, the time constant of digital/analog feedback circuit 242 is dependent on a digital clock circuit rather than passive circuit components. The clock frequency can be easily modified, or can be designed to be "programmable, to adjust the circuit response time for different applications. Fourth, while strictly analog integrator circuits generally take a finite amount of time to settle out in initial operation, this initial settling time can be significantly reduced in the digital/analog feedback circuit 242 by initially clocking the up/down counter 258 with a higher clock frequency. Finally, $R_F$ 276 can be modified to adjust the range of offset accounted for on the input circuit independently of the gain feedback resistor $R_V$ 230. As $R_F$ 276 is increased, the input offset range is reduced, but the output steps of $I_F$ are also reduced, thereby providing higher resolution. This feature provides the circuit designer with an additional degree of freedom to optimize the circuit for various applications.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected. For example, those skilled in the art will recognize that the output 238 of low pass filter 236 may be alternatively supplied to inverting input 252 of comparator 248, and that up/down counter 258 may be correspondingly designed to decrement the count value when $V_{OUT}$ exceeds $V_{REF2}$ and increment the count value when $V_{REF2}$ exceeds $V_{OUT}$. An important aspect of the design of comparator 248 and up/down counter 258 lies not in the actual configuration thereof but in ensuring that analog/digital feeback circuitry 242 provides an appropriate negative feedback path.

The embodiments of the invention in which an exclusive property of privilege is claimed are defined as follows:

1. Analog signal conditioning circuitry comprising:
    an amplifier having a first input receiving an analog input signal defined by a first ac signal component due to a driving force and a first dc offset component independent of the driving force, a second input receiving a reference signal and an output providing an analog output signal defined by an amplified representation of the analog input signal and said reference signal; and
    a feedback circuit having a periodic clock signal associated therewith, a first input coupled to said amplifier output, a second input receiving said reference signal, and an output connected to said first input of said amplifier for providing an analog feedback signal thereto, said feedback circuit incrementally increasing said analog feedback signal each clock cycle that said analog output signal exceeds said reference signal and incrementally decreasing said analog feedback signal each clock cycle that said reference signal exceeds said analog output signal, said analog feedback signal compensating for variations in said first dc offset component of said analog input signal to thereby maintain the amplified representation of said first dc offset component of said analog output signal within a predefined range of said reference signal.

2. The circuitry of claim 1 wherein said feedback circuit includes:
    a comparator having a non-inverting input corresponding to said first input of said feedback circuit, an inverting input corresponding to said second input of said feedback circuit, and an output providing a high level output signal when said analog output signal exceeds said reference signal, and providing a low level output signal when said reference signal exceeds said analog output signal;
    an up/down counter having a first input connected to said comparator output and a plurality of digital outputs, said up/down counter responsive to said periodic clock signal to increment a count value each clock cycle when said comparator provides a high level output signal thereto and to decrement said count value each clock cycle when said comparator provides a low level output signal thereto, said up/down counter providing digital signals to said plurality of digital outputs corresponding to said count value; and
    a D/A converter having a plurality of inputs connected to corresponding ones of said plurality of digital outputs of said up/down counter and an output corresponding to said output of said feedback circuit, said D/A converter converting said plurality of digital signals to said analog feedback signal.

3. The circuitry of claim 2 further including a feedback resistor having a feedback resistor value disposed between said output of said D/A converter and said first input of said amplifier;
    wherein said feedback resistor value is inversely proportional to a magnitude of the variations in said first dc offset component of said analog input signal.

4. The circuitry of claim 2 wherein the number of said plurality of outputs provided by said up/down counter and the corresponding number of said plurality of inputs provided by said D/A is directly proportional to the magnitude of the variations in said first dc offset component of said analog input signal.

5. The circuitry of claim 2 further including a clock circuit providing said periodic clock signal to said feedback circuit.

6. The circuitry of claim 5 wherein said clock circuit is operable to provide a variable rate periodic clock signal.

7. The circuitry of claim 1 further including:
    an accelerometer responsive to acceleration to provide a differential analog acceleration signal defined by a second ac signal component due to acceleration and a second dc offset component independent of acceleration; and
    a transconductance circuit receiving said differential analog acceleration signal and providing said analog input signal therefrom.

8. The circuitry of claim 1 further including a low pass filter having an input connected to said amplifier output and an output providing a low frequency representation of the analog output signal;
    wherein said first input of said feedback circuit is connected to said low pass filter output.

9. Feedback circuitry for minimizing dc offset variations in an analog output signal of a gain circuit having an input receiving an analog input signal defined by an ac signal component due to a driving force and a dc offset component independent of the driving force, comprising:
    a comparator having a first input receiving the analog output signal, a second input receiving a reference signal corresponding to a desired dc offset component of the analog output signal, and an output;
    a counter circuit having a count value associated therewith, a first input connected to said comparator output and a plurality of counter outputs, said counter circuit periodically changing said count value in a first direction when the analog output signal exceeds said reference signal and periodically changing said count value in a second opposite direction when said reference signal exceeds the analog output signal, said counter circuit providing digital output signals at said plurality of counter outputs corresponding to said count value; and
    a signal converter circuit having a corresponding plurality of inputs connected to said plurality of counter outputs and an output connected to the input of the gain circuit, said signal converter circuit converting said plurality of digital output signals to an analog feedback signal and providing said analog feedback signal to said converter circuit output, said analog feedback signal minimizing variations in said desired dc offset component of the analog output signal by compensating for variations in the dc offset component of the analog input signal.

10. The feedback circuitry of claim 9 further including a clock circuit providing a periodic clock signal to said counter circuit, said counter circuit changing said count value in said first direction each clock cycle that the analog output signal exceeds the reference signal, and changing said count value in said second direction each clock cycle that the reference signal exceeds the analog output signal.

11. The feedback circuitry of claim 9 wherein the number of said counter outputs provided by said counter circuit and the corresponding number of inputs provided by said converter circuit is directly proportional to the magnitude of the variations in the dc offset component of the analog input signal.

12. The circuitry of claim 9 further including a feedback resistor having a feedback resistor value disposed between said output of said signal converter circuit and the input of the amplifier;

wherein said feedback resistor value is inversely proportional to a magnitude of the variations in the dc offset component of the analog input signal.

13. The circuitry of claim 9 wherein said first direction corresponds to incrementing said count value and said second direction corresponds to decrementing said count value.

14. In combination:

an analog signal amplifier circuit having a first input receiving an analog input signal defined by a first ac signal component due to a driving force and a first dc offset component independent of the driving force, a second input receiving a reference signal and an output providing an analog output signal defined by an amplified representation of the analog input signal and the reference signal; and feedback circuitry for minimizing dc offset variations in the analog output signal, the feedback circuitry having a count value associated therewith, a first input receiving the analog output signal, a second input receiving the reference signal and an output connected to the first input of the analog signal amplifier circuit, said feedback circuitry periodically changing said count value in a first direction when the analog output signal exceeds the reference signal and periodically changing said count value in a second opposite direction when the reference signal exceeds the analog output signal, said feedback circuitry providing an analog feedback signal at said feedback circuitry output proportional to said count value, said analog feedback signal minimizing dc offset variations in the analog output signal by compensating for variations in the first dc offset component of the analog input signal.

15. The combination of claim 14 wherein said analog signal amplifier circuit further includes:

an accelerometer responsive to acceleration to provide a differential analog acceleration signal defined by a second ac signal component due to acceleration and a second dc offset component independent of acceleration; and a transconductance circuit receiving said differential analog acceleration signal and providing said analog input signal therefrom.

16. The circuitry of claim 14 wherein said first direction corresponds to incrementing said count value and said second direction corresponds to decrementing said count value.

17. The combination of claim 16 wherein said feedback circuitry includes:

a comparator having a non-inverting input corresponding to said first input of said feedback circuitry, an inverting input corresponding to said second input of said feedback circuitry, and an output providing a high level output signal when the analog output signal exceeds the reference signal, and providing a low level output signal when the reference signal exceeds the analog output signal;

an up/down counter having a first input connected to said comparator output and a plurality of digital outputs, said up/down counter responsive to a periodic clock signal to increment said count value each clock cycle when said comparator provides a high level output signal thereto and to decrement said count value each clock cycle when said comparator provides a low level output signal thereto, said up/down counter providing digital signals to said plurality of digital outputs corresponding to said count value; and a D/A converter having a plurality of inputs connected to corresponding ones of said plurality of digital outputs of said up/down counter and an output corresponding to said output of said feedback circuitry, said D/A converter converting said plurality of digital signals to said analog feedback signal.

18. The combination of claim 17 further including a feedback resistor having a feedback resistor value disposed between said output of said D/A converter and the first input of the amplifier circuit;

wherein said feedback resistor value is inversely proportional to a magnitude of the variations in the first dc offset component of the analog input signal.

19. The combination of claim 17 wherein the number of said plurality of outputs provided by said up/down counter and the corresponding number of said plurality of inputs provided by said D/A is directly proportional to the magnitude of the variations in the first dc offset component of the analog input signal.

20. The combination of claim 17 further including a clock circuit providing said periodic clock signal to said up/down counter.

21. The combination of claim 14 wherein said analog signal amplifier circuit further includes a low pass filter having an input receiving the analog output signal and providing a low frequency representation of the analog output signal at an output thereof;

and wherein said first input of said feedback circuitry is connected to said low pass filter output.

22. The combination of claim 14 wherein said analog signal amplifier circuit and said feedback circuitry are formed of a single integrated circuit.

* * * * *

UNITED STATES PATENT AND TRADEMARK OFFICE
CERTIFICATE OF CORRECTION

PATENT NO.     : 6,426,663 B1
DATED          : July 30, 2002
INVENTOR(S)    : Gregory J. Manlove et al.

It is certified that error appears in the above-identified patent and that said Letters Patent is hereby corrected as shown below:

Title page,
Item [*] Notice, delete "0" and insert -- 1064 --.

Signed and Sealed this

Thirtieth Day of August, 2005

JON W. DUDAS
*Director of the United States Patent and Trademark Office*